Patented Apr. 8, 1924.

1,489,380

UNITED STATES PATENT OFFICE.

WALTER BADER, OF SPONDON, NEAR DERBY, ENGLAND, AND DONALD ARCHER NIGHTINGALE, OF CUMBERLAND, MARYLAND; SAID BADER ASSIGNOR TO THE AMERICAN CELLULOSE & CHEMICAL MANUFACTURING COMPANY, LIMITED, INC., OF NEW YORK, N. Y., A CORPORATION OF DELAWARE.

MANUFACTURE OF ALKYL DERIVATIVES.

No Drawing. Application filed June 18, 1921. Serial No. 478,709.

*To all whom it may concern:*

Be it known that we, WALTER BADER, a citizen of the Swiss Republic, of Spondon, near Derby, England, and DONALD ARCHER NIGHTINGALE, a subject of the King of Great Britain and Ireland, of Cumberland, Maryland, U. S. A., have invented certain new and useful Improvements in or Relating to the Manufacture of Alkyl Derivatives, of which the following is a specification.

This invention relates in particular to the manufacture of monomethylamine but may also be applied for the manufacture of higher monoalkylamines.

Monomethylamine may be prepared by the action of bromine and caustic potash on acetamide (A. W. Hofmann, Ber. 1882, page 765), but this process is expensive, and the product always contains ammonia. The cheaper chlorine cannot be used instead of bromine, because its action on acetamide is irregular and may even lead to violent explosion.

A modification of the Hofmann reaction, which is applied in industrial practice, consists in the reaction of alkali hypochlorites upon acid amides. In the case of acetamide however this reaction cannot be kept under control if relatively large quantities are used. The evolution of suffocating gases and occasional explosions render the process much too dangerous for production on a manufacturing scale. Moreover the methylamine produced contains about 25% of ammonia, besides dimethylamine, and therefore requires an expensive process of purification.

It has been proposed to substitute calcium hypochlorite and milk of lime for sodium hypochlorite and caustic soda. This indeed does away with danger in the performance of the process, and the product is nearly chemically pure, but the yield is at the best only about 20% of the theoretical yield.

According to the present invention, acetamide is caused to react in aqueous solution with calcium hypochlorite or other earth alkali hypochlorite or other hypochlorite except alkali hypochlorites, in the presence of lime or any other hydrate of an alkaline earth, sodium carbonate, borate or phosphate or other alkali carbonate, borate, phosphate, or analogous alkaline salt capable of forming caustic alkali in reaction with the alkali earth hydrate being added or caused to act so that the first stage of the reaction, i. e. the formation of acetyl chloro amide, takes place in the absence of strong alkali, while the final stage, viz, the formation of methylamine, is brought about by the slow and gradual formation of caustic soda or caustic alkali in the mixture by the gradual or progressive reaction of the alkaline salt on the alkali earth hydrate.

In carrying out the invention we add the sodium carbonate or other alkaline salt to a mixture of acetamide, hypochlorite and hydrate of calcium or other earth alkali, and water, the temperature being preferably kept low during the mixing of the acetamide, hypochlorite and hydrate and during the addition of the alkaline salt until heat ceases to be developed by the reaction, i. e. until no rise in temperature occurs when external cooling is removed.

We have found that a very good yield of pure monomethylamine can be obtained by mixing acetamide with milk of lime and calcium hypochlorite (bleaching powder) at a low temperature and then adding sodium carbonate while preferably keeping the temperature low. Preferably the sodium carbonate is added gradually, the rate of addition depending upon the efficiency of the cooling arrangements. On boiling the resulting mixture, methylamine distils away and may be absorbed or condensed in any convenient manner. Very high yields approaching the theoretical can be thus obtained, for example over 80% of the theoretical amount.

The new and useful technical effect of our invention may be ascribed to the absence of strong alkalinity during the presence of acetamide, while the final stage is brought about smoothly by the slow and gradual formation of caustic soda in the mixture, the alkalinity never being strong enough to hydrolyze acetamide at low temperature.

*Example.*

900 lb. of bleaching powder of 30% available chlorine content are suspended in water, in a suitable container fitted with stirring gear and cooling jacket. Milk of lime made with 900 lb. of quick lime is added, and the mixture cooled to +5° C. An aqueous solution of 200 lb. acetamide is added whilst maintaining the temperature low, and the 2000 lb. sodium carbonate (soda ash) is gradually added and dissolved in the mixture whilst maintaining the cooling, and the resulting mixture is afterwards heated and eventually boiled. The escaping methylamine gas may be condensed or absorbed or otherwise obtained in any suitable form; for example it may be absorbed in hydrochloric acid, and about 200 lb. monomethylamine hydrochloride of high purity obtained.

It is to be understood that our invention is not limited by the particular conditions set out in the example, which may be varied considerably within the spirit of the invention.

Instead of acetamide, amides of higher acyls, for example, propionamide, may be treated according to the invention to obtain corresponding mono alkylamines, for example ethylamine.

What we claim and desire to secure by Letters Patent is:—

1. Process for the manufacture of mono-alkylamines, characterized in that an acylamide is caused to react with an alkaline earth metal hypochlorite, and with an alkaline earth metal hydroxide, with the application of a salt of an alkaline metal capable of forming hydroxide of an alkali metal in reaction with the alkaline earth metal hydroxide, the first stage of the reaction taking place in the absence of strong alkali and the final stage being brought about by the slow and gradual formation of hydroxide of alkali metal in the mixture by the gradual action of the salt of alkali metal on the alkaline earth metal hydroxide.

2. Process for the manufacture of mono-alkylamines, characterized in that an acylamide is caused to react with an alkaline earth metal hypochlorite, and with an alkaline earth metal hydroxide, with the application of a salt of an alkali metal capable of forming hydroxide of an alkali metal in reaction the alkaline earth metal hydroxide, the first stage of the reaction taking place in the absence of strong alkali and the final stage being brought about by the slow and gradual formation of hydroxide of alkali metal in the mixture by the gradual action of the salt of alkali metal on the alkaline earth metal hydroxide, the temperature being kept low during exothermic reaction.

3. Process for the manufacture of monomethylamine, characterized in that acetamide is caused to react with alkaline earth metal hypochlorite and with alkaline earth metal hydroxide, with the application of a salt of an alkaline metal capable of forming hydroxide of an alkali metal in reaction with the alkaline earth metal hydroxide, the first stage of the reaction taking place in the absence of strong alkali, and the final stage being brought about by the slow and gradual formation of hydroxide of alkali metal in the mixture by the gradual action of the salt of alkali metal on the alkaline earth metal hydroxide.

4. Process for the manufacture of monomethylamine, characterized in that acetamide is caused to react with alkaline earth metal hypochlorite and with alkaline earth metal hydroxide, with the application of a salt of an alkaline metal capable of forming hydroxide of an alkali metal in reaction with the alkaline earth metal hydroxide, the first stage of the reaction taking place in the absence of strong alkali, and the final stage being brought about by the slow and gradual formation of hydroxide of alkali metal in the mixture by the gradual action of the salt of alkali metal on the alkaline earth metal hydroxide, the temperature being kept low during exothermic reaction.

5. Process for the manufacture of monomethylamine, characterized in the acetamide is caused to react with calcium hypochlorite and with calcium hydrate, with the application of sodium carbonate, the first stage of the reaction taking place in the absence of strong alkali, and the final stage being brought about by the slow and gradual formation of caustic soda in the mixture by the gradual action of the sodium carbonate on the calcium hydrate.

6. Process for the manufacture of monomethylamine, characterized in that acetamide is caused to react with calcium hypochlorite and with calcium hydrate, with the application of sodium carbonate, the first stage of the reaction taking place in the absence of strong alkali, and the final stage being brought about by the slow and gradual formation of caustic soda in the mixture by the gradual action of the sodium carbonate on the calcium hydrate the temperature being kept low during exothermic reaction.

In testimony whereof we have hereunto subscribed our names.

WALTER BADER.
DONALD ARCHER NIGHTINGALE.